United States Patent [19]

Braun

[11] Patent Number: 4,643,853

[45] Date of Patent: Feb. 17, 1987

[54] PACKING ELEMENT FOR USE IN MASS TRANSFER OR HEAT TRANSFER COLUMNS

[75] Inventor: Roland Braun, Ludwigshafen am Rhein, Fed. Rep. of Germany

[73] Assignee: RASCHIG GmbH, Ludwigshafen am Rhein, Fed. Rep. of Germany

[21] Appl. No.: 716,485

[22] Filed: Mar. 27, 1985

[30] Foreign Application Priority Data

Apr. 14, 1984 [DE] Fed. Rep. of Germany ....... 3414267

[51] Int. Cl.[4] .............................................. B01F 3/04
[52] U.S. Cl. .................................................... 261/112
[58] Field of Search ................................ 261/112, 113

[56] References Cited

U.S. PATENT DOCUMENTS

| | | | |
|---|---|---|---|
| 3,430,934 | 3/1969 | Weishaupt | 261/94 |
| 3,599,943 | 8/1971 | Munters | 261/112 |
| 3,656,280 | 4/1972 | Perry | 261/113 |
| 3,785,620 | 1/1974 | Huber | 261/112 |
| 4,052,491 | 10/1977 | Lefevre | 261/112 |
| 4,338,266 | 7/1982 | Flower | 261/112 |
| 4,344,899 | 8/1982 | Monjoie | 261/112 |
| 4,427,606 | 1/1984 | Chen et al. | 261/113 |

FOREIGN PATENT DOCUMENTS

| | | | |
|---|---|---|---|
| 2032292 | 4/1971 | Fed. Rep. of Germany | 261/112 |
| 2722424 | 6/1984 | Fed. Rep. of Germany | |
| 608380 | 1/1979 | Switzerland | |
| 229740 | 2/1925 | United Kingdom | 55/156 |
| 294635 | 4/1971 | U.S.S.R. | 261/112 |

*Primary Examiner*—Tim Miles
*Attorney, Agent, or Firm*—Osann, Kramer, Dvorak, Balogh, Genova & Traub

[57] ABSTRACT

This invention relates to a packing element for use in mass transfer or heat transfer columns in which gas and/or liquid streams are conducted, particularly in opposing streams, such as are used in distillation, rectification and absorption towers. It is desired to provide such packing elements which can be manufactured at low cost and which can be assembled to form a packing that has a higher effectiveness and involves a smaller pressure loss. This is accomplished in that the plates are formed with through slits, which are preferably parallel to each other and staggered in length and are spaced apart throughout their length so that laterally adjacent slits define bridgelike lands. Such slits act as capillaries so that a droplet impinging on the plate at a slit will spread along the slit and the plate will thus be wetted on a larger area.

8 Claims, 3 Drawing Figures

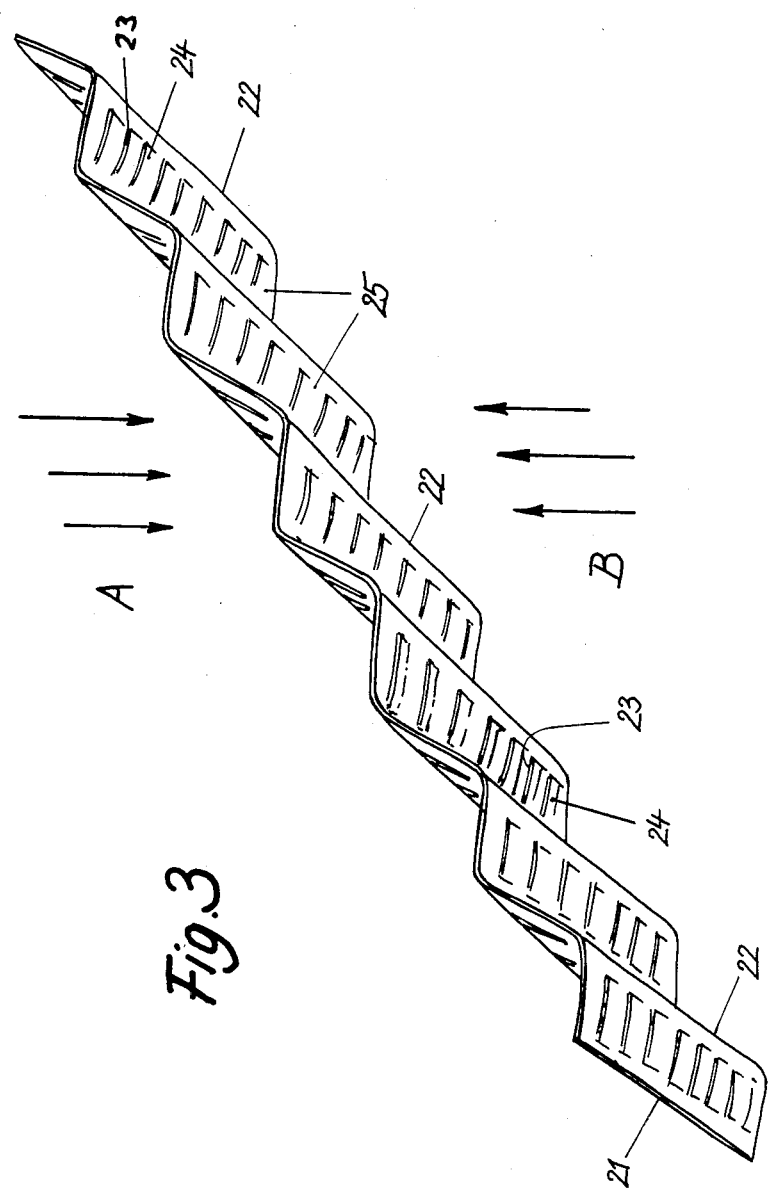

PACKING ELEMENT FOR USE IN MASS TRANSFER OR HEAT TRANSFER COLUMNS

BACKGROUND OF THE INVENTION

1. Field of the Invention

This invention relates to a packing element for use in mass transfer or heat transfer columns in which gas and/or liquid streams are conducted, particularly in opposing streams, such as are used in distillation, rectification and absorption towers.

2. Description of the Prior Art

Known packing elements of that kind are used in systematically composed packings in mass transfer and heat transfer columns. The packing elements consist of plates which extend in the direction of flow and are formed with corrugations extending at an angle to the direction of flow. In such packings adjacent corrugations of adjacent packing elements cross and contact each other. In accordance with Swiss Patent Specification No. 608,380 the plates of such packings are provided with holes and in accordance with German Patent Specification No. 27 22 424 the plates have fine grooves, which increase the turbulence of the opposing streams and, as a result, the effectiveness of the process.

SUMMARY OF THE INVENTION

It is an object of the invention to provide packing elements which can be used for the purposes outlined hereinbefore with a higher effectiveness and involve a low pressure drops and can be manufactured at low cost.

In a packing element for use in mass transfer or heat transfer columns in which gas and/or liquid streams are conducted, particularly in opposing streams, packing the element comprises at least one plate adapted to extend in the direction of flow and formed with corrugations, which in the assembled packing extend at an angle to the direction of flow, in which packings adjacent corrugations of adjacent packing elements cross and contact each other, the object is accomplished in that the or each plate is formed with a plurality of juxtaposed through slits, which are preferably parallel to each other and staggered in length and which are spaced apart throughout their length so that bridgelike lands are defined between laterally adjacent slits.

Packings composed of such packing elements exhibit a surprisingly high effectiveness and a low pressure drop so that a low specific pressure drop equal to the quotient of the total pressure drop divided by the ideal plate number is obtained and the packing is relatively inexpensive. The slits constitute capillaries, which cause a droplet impinging on a slit to spread along the slits.

To assemble a packing the plates may be joined at their edges by means of wires, anchoring means or spot welds in such a manner that adjacent corrugations of adjacent packing plates cross and contact each other. Alternatively, the packing elements may support each other in the assembled packing in the desired orientation or may be tightly held together by woven wire mesh at their edges. Such an arrangement of packing elements in a packing is known per se.

BRIEF DESCRIPTION OF THE DRAWINGS

FIG. 3 is a perspective view showing a plate of a third embodiment.

DETAILED DESCRIPTION OF THE PREFERRED EMBODIMENTS

Figure 1:
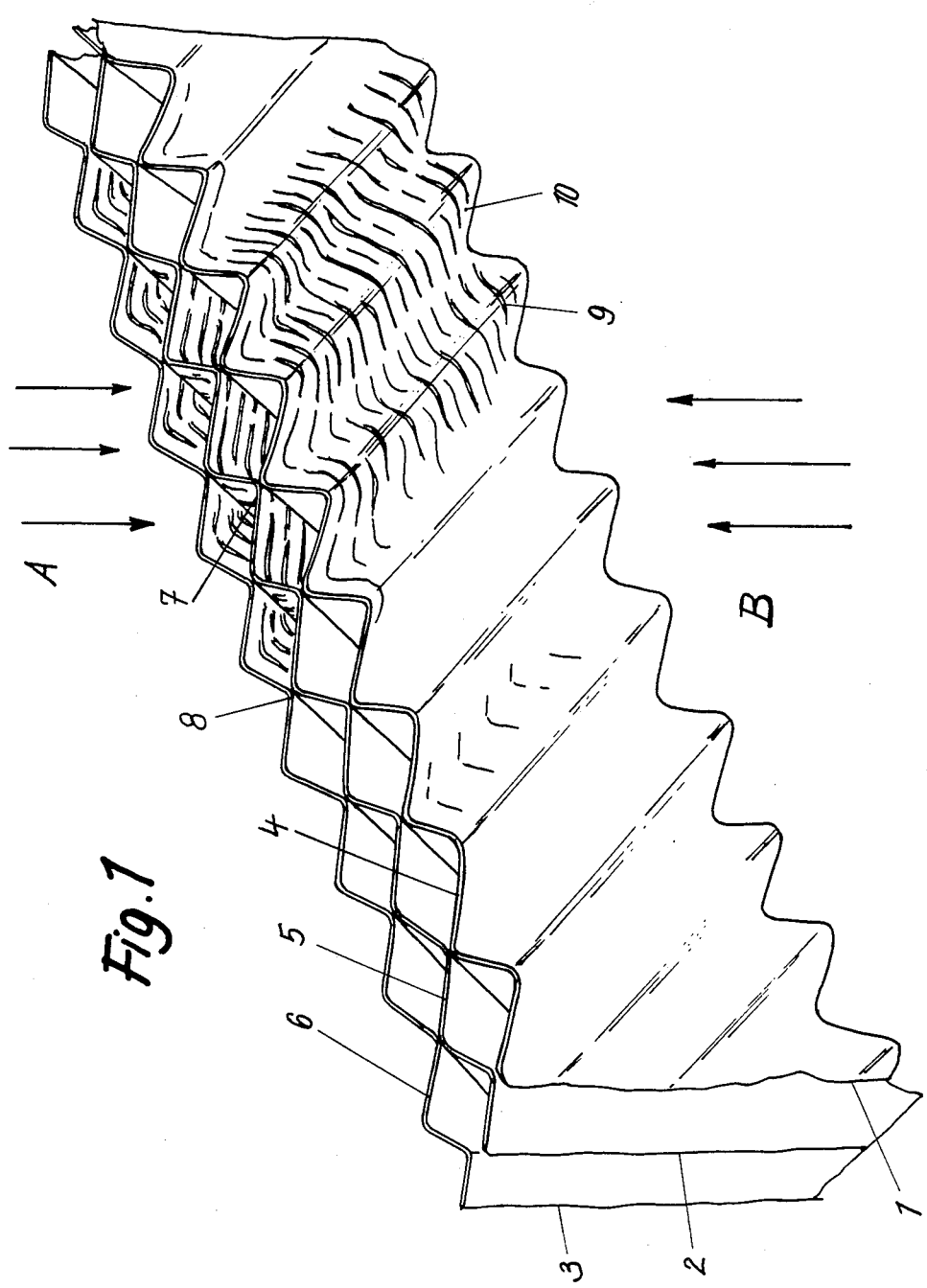
FIG. 1 is a perspective view showing a packing element comprising three plates of a first embodiment.

Preferred embodiments of packing elements for use in mass transfer or heat transfer columns are shown on the drawing and will be described more in detail hereinafter.

FIG. 1 shows corrugated plates 1, 2 and 3 formed with corrugations 4, 5 and 6, which have curved crests and troughs and extend at an angle to the directions of flow A and B in the column. The plates are packed in such an orientation that adjacent corrugations of adjacent plates cross and contact each other at 7 and 8. Each of the plates 1, 2 and 3 is formed with a plurality of juxtaposed through slits 9 and 10, which are parallel to each other and staggered in length and are spaced apart throughout their length so that bridgelike lands are defined in the plate between laterally adjacent slits.

Figure 2:
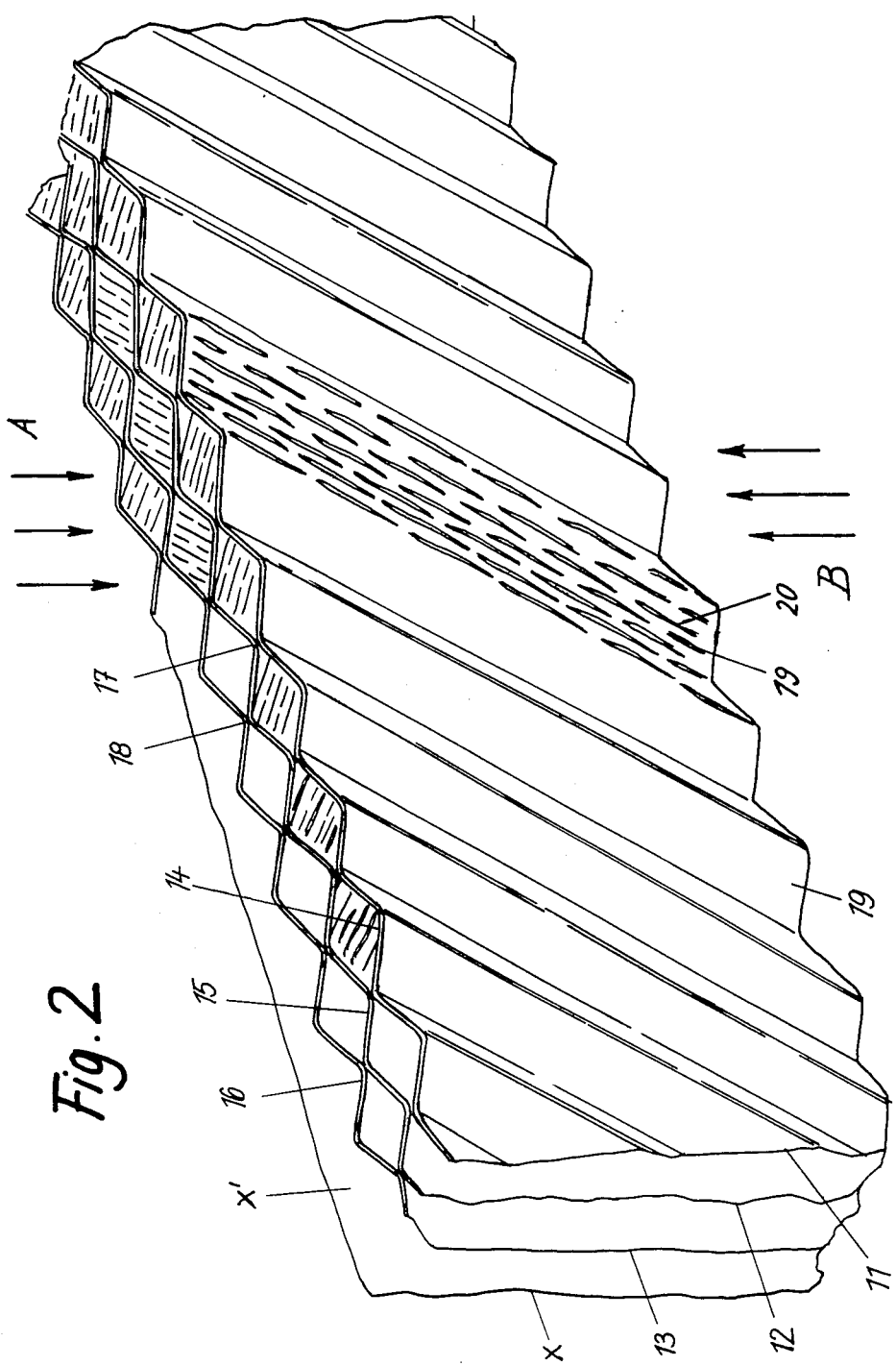
FIG. 2 is a perspective view showing a packing element comprising four plates of a second embodiment.

FIG. 2 shows plates 11, 12 and 13 and X formed with foldlike corrugations 14, 15, 16 and X'. Said corrugations extend at an angle to the opposing directions of flow A and B and in the packing adjacent corrugations of adjacent plates cross and contact each other, e.g., at points 17 and 18. The plates 11, 12, 13 and X' are formed with a plurality of juxtaposed through narrow slits 19 and 20, which are parallel to each other and staggered in length and are spaced apart so that the plate has bridgelike lands defined by laterally adjacent slits.

In the embodiments shown in FIGS. 1 and 2 the slits are formed in the thin plate material before the same is corrugated. The corrugating of the plate material results in irregular deformations of the plate material at the slits. The plates have suitably a wall thickness of about 0.2 mm if the plates are made of stainless steel and of 0.3 mm if the plates are made of plain carbon steel.

The slits may be formed by means of shearing knives in flat strip material moving past the knives. The slits may be parallel or at an angle to each other but must be spaced apart throughout their length so that they do not communicate with or intersect each other. The slits may be arranged in a plurality of lines and the slits of adjacent lines may be staggered in length. In any case, the plate must comprise bridgelike lands between laterally adjacent slits. The strip which has been formed with the slits is subsequently corrugated and is then cut to length to form the desired plates.

The plate 21 shown in FIG. 3 is formed with corrugations 22, which extend at an angle to the opposing directions of flow A and B. That plate is packed with other plates in the same manner as in the preceding embodiments. The plate 21 is formed with angled slits 23, each of which defines on one side a louverlike plate portion 24, which slightly protrudes from the opposite side of the slit 23. The slits 23 are formed only on the sloping portions 25 of the corrugations whereas the troughs 21 and crests 22 are solid.

Each of the angled slits 23 has a relatively long slit portion and a relatively short slit portion which extends from one end of said relatively long portion and which in the assembled packing depends from that end. The louverlike plate portions 24 associated with laterally adjacent slits may protrude on mutually opposite sides of the plate.

In all embodiments the length of the slits is much smaller than the corresponding dimension of the plate. The length of the slits should not exceed one to two wavelengths of the corrugated plates. The slits are preferably relatively short and consist of incisions in the plate material.

I claim:

1. In a packing element for use in a column for contacting flowing fluids with each other, which packing element comprises at least one plate extending in direction of flow of the fluids, having a longitudinal direction and a lateral direction at right angles to said longitudinal direction, said plate formed with corrugations extending at oblique angles to the direction of the flow and to both said longitudinal and lateral directions, the improvement which comprises said corrugations having rounded crests and troughs and said plate formed with a plurality of juxtaposed through narrow capillary slits which are parallel and staggered in length, each slit being narrow enough to cause a droplet of fluid to spread along the slit, and spaced apart throughout their length so that bridgelike lands are defined between laterally adjacent slits, said slits constituting capillaries which cause said fluids impinging on each of said slits to spread along said slits, each of said slits extending at an angle to said corrugations and on one side defining a louverlike portion of said plate and each of said louverlike portions protruding in an upset fashion from the opposite side of the associated slit to disturb the flow of the fluid as it flows along the surface of said plate.

2. The improvement set forth in claim 1, wherein said slits have a maximum length of one to two wavelengths of said corrugated plate.

3. The improvement set forth in claim 1, wherein
said corrugations have crests and troughs and
said slits are formed only in said sloping portions.

4. The improvement set forth in claim 3, wherein said louverlike portions defined by laterally adjacent ones of said slits protrude on opposite sides of said plate.

5. The improvement set forth in claim 3 as applied to a packing element which comprises a plurality of said plates, which have confronting broadsides and are so arranged that adjacent ones of said corrugations of adjacent ones of said plates cross and contact each other.

6. In a packing installed in a column for contacting generally vertically flowing fluids with each other, which packing comprises at least one packing element comprising a plurality of plates which have confronting broadsides, each of said plates extending in direction of flow of the fluids and having a horizontal-longitudinal direction and a vertical-lateral direction, and being formed with corrugations extending at oblique angles to the direction of the flow and to both said longitudinal and lateral directions, the improvement comprising each of said plates formed with a plurality of juxtaposed through narrow capillary slits which are staggered in length and spaced apart throughout their length, so that bridgelike lands are defined between laterally adjacent slits, each of said slits extending at an angle to said plate corrugations and on one side defining a louverlike portion of said plate, each slit being narrow enough to cause a droplet of fluid to spread along the slit, and each of said louverlike portions protruding in an upset fashion from the opposite side of the associated slit to disturb the flow of the fluid as it flows along the surface of said plate, said corrugations having rounded crests, rounded troughs, and sloping portions, and said slits being formed only in said sloping portions.

7. The improvement set forth in claim 6, wherein said slits extend generally horizontally.

8. The improvement set forth in claim 6, wherein
said slits are vertically spaced apart, and
each of said slits comprises a generally horizontal, relatively long slit portion and a relatively short slit portion depending from said relatively long slit portion at one end thereof.

* * * * *